T. TURNER.
DISTRIBUTER FOR FERTILIZER, ASHES, AND THE LIKE.
APPLICATION FILED JULY 29, 1915.
1,178,976.
Patented Apr. 11, 1916.
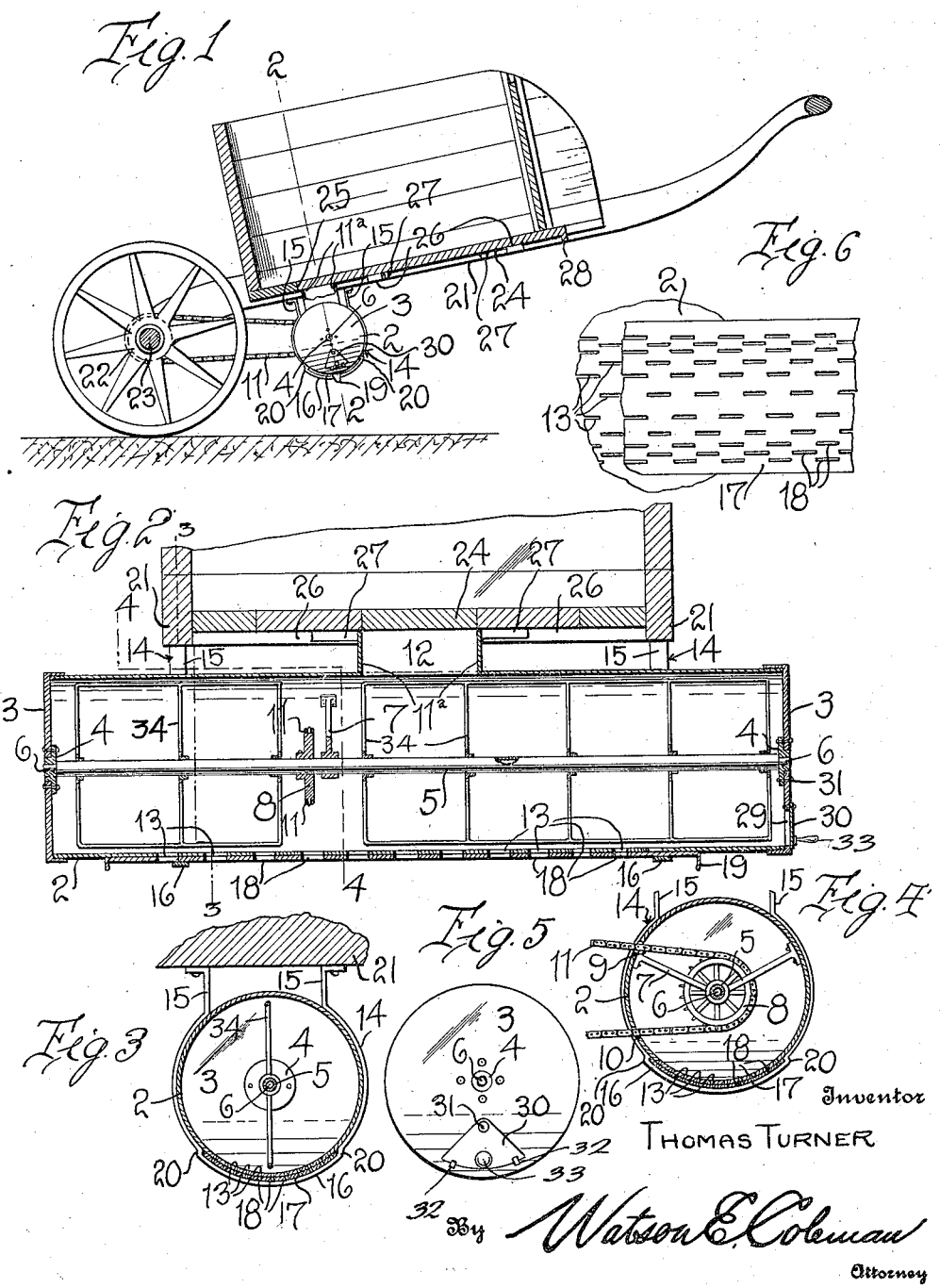
Inventor
Thomas Turner
By Watson E. Coleman
Attorney

UNITED STATES PATENT OFFICE.

THOMAS TURNER, OF YONKERS, NEW YORK.

DISTRIBUTER FOR FERTILIZER, ASHES, AND THE LIKE.

1,178,976. Specification of Letters Patent. Patented Apr. 11, 1916.

Application filed July 29, 1915. Serial No. 42,581.

*To all whom it may concern:*

Be it known that I, THOMAS TURNER, a citizen of the United States, residing at Yonkers, in the county of Westchester and State of New York, have invented certain new and useful Improvements in Distributers for Fertilizer, Ashes, and the like, of which the following is a specification, reference being had to the accompanying drawings.

My invention relates to devices for distributing fertilizer or for spreading ashes, saw-dust, sand, etc., and particularly to fertilizer distributers adapted to be used in connection with lawns, gardens, vegetable patches, etc.

The primary object of my invention is the provision of a distributer of an extremely simple character, which may be readily attached to a wheel-barrow or like hand-propelled carriage, or as readily removed therefrom, and so constructed that it will effectively distribute fertilizer of any character. It may also be used for spreading ashes, saw-dust, etc., on icy walks or roads, or it might be used under certain circumstances for seeding purposes.

A further object of my invention is the provision of a fertilizer distributer of this character in which the apertures for the discharge of the fertilizer may be readily adjusted and thus the distribution of fertilizer may be controlled.

A further object of the invention is to so construct the fertilizer distributer that it is made of very few parts and these of a very simple character which may be readily made and assembled to thereby permit the distributer to be sold at a low price.

Other objects will appear in the course of the following description.

My invention is illustrated in the accompanying drawing, wherein:

Figure 1 is a side elevation of a wheelbarrow constructed in accordance with my invention; Fig. 2 is a section on the line 2—2 of Fig. 1; Fig. 3 is a section on the line 3—3 of Fig. 2; Fig. 4 is a section on the line 4—4 of Fig. 2; Fig. 5 is an end view of the cylinder; and Fig. 6 is a detail view of the regulating slide.

Referring to the drawing it will be seen that the distributer itself comprises a cylinder 2 which may be of any convenient length or diameter, but which is in the majority of cases made about 36 inches long with a diameter of 8 inches. This cylinder at opposite ends is closed by the screw threaded caps, 3, each having a central shaft opening. This opening is bushed by a bushing 4 which extends through the opening and has a flange upon its inner face which is riveted to the cap. Disposed within the cylinder 2 and extending longitudinally therealong is a shaft 5 which may be made of metallic pipe and which is provided with gudgeons 6 at its ends which extend through the bearings in the bushings 4.

The shaft 5 is preferably supported intermediate its ends by means of a preferably V-shaped hanger 7, this hanger being riveted or otherwise attached to the side walls of the cylinder. Adjacent this hanger 7 the shaft is provided with a sprocket wheel 8 which may be of any convenient size but which is shown as having a diameter of about two inches. The forward wall of the cylinder 2 is formed with slots 9 and 10, (see Fig. 4), one disposed above the shaft and the other below, through which a sprocket chain 11 passes, this sprocket chain being engaged by a sprocket wheel mounted upon the wheel shaft of the wheel-barrow upon which the fertilizer distributer is mounted, as will hereinafter appear.

The cylinder 2 is formed on its upper side with an inlet opening 12 defined by upwardly extending walls 11$^a$ which may be closed by a lid if desired. Through this inlet opening the cylinder is adapted to be filled if desired. The bottom of the cylinder is formed with a plurality of longitudinally extending slots 13, these slots having a preferable length of one inch and being preferably a quarter of an inch wide. These slots are shown as in staggered relation to each other and there may be as many rows of these slots as desired.

For the purpose of distributing the material within the cylinder 2 evenly throughout the entire extent of the cylinder and causing the material to fall through the slots, I mount upon the shaft 5 a plurality of mixing elements or agitators 34. As illustrated, these mixing elements are formed of $\frac{3}{16}$ steel wire which is passed through and brazed or welded to the shaft. Each of these mixers has a portion which extends radially of the shaft and oppositely disposed portions which extend parallel to the shaft. The diametrically extending members of the mixer are preferably 5½ inches apart and extend outward 3¾ inches from the shaft. It will also be understood that the mixers have ⅛ of an inch clearance on the inside face of the cylinders.

For the purpose of supporting the cylinder upon a wheel-barrow or other carriage, I rivet to the cylinder the oppositely disposed hangers 14. These hangers extend around the cylinder and having upwardly extending ends 15. That portion of each hanger which extends around the lower portion of the cylinder is laterally offset as at 16 to accommodate a regulating slide 17. This slide is arcuate in form and is provided with a plurality of slots 18 adapted to register with the slots 13. At one extremity this slide 17 is formed with a lip 19 whereby the slide may be shifted longitudinally. The slide may be shifted longitudinally but is held from any movement around the cylinder 2 by means of the shoulders 20 on the bands 14. When the slide is pulled out to its full extent the perforations in the slide are in full register with the slots in the cylinder. When the slide is pushed in, however, it partially or entirely closes the openings in the cylinder and thus the length of these slots may be regulated to the size desired for distribution.

As illustrated in Fig. 1, the cylinder 2 is intended to be supported upon the under side of an ordinary standard wheel-barrow, the hangers 14 being adapted to be connected by bolts to the longitudinal beams 21 of the barrow. The cylinder is so mounted upon the barrow that the slots 9 and 10 are immediately opposite a sprocket wheel 22 which is mounted upon the wheel axle or hub 23 so that the mixers within the cylinder may be driven by the rotation of the wheel of the barrow. The wheel-barrow is provided with a middle bottom board 24 which is cut 2½ inches from the inside of the front of the barrow at 25. This board 24 is 5 inches wide and may be pulled out to extend 2 inches. The board is held in position by the transverse cleats 26 and attached to the board are the stop cleats 27 which prevent the board from being pulled out to any greater extent. The board is provided at its rear extremity with the finger piece 28 whereby it may be regulated. The board normally closes the filling opening of the cylinder. In order to provide for either filling the cylinder through one end thereof or discharging refuse from the cylinder, I provide one of the caps with a discharge opening 29 normally covered by a pivot closure or gate 30, this gate being pivoted at 31 and being held to its position by means of the overhanging members 32 and being provided with a handle 33. It will be obvious that when the distributing cylinder is mounted upon a wheel-barrow and it is desired to discharge any refuse which may have accumulated within the cylinder it is only necessary to open the gate or closure 30 and then tilt the wheel-barrow to one side.

The operation of my invention will be obvious from what has gone before. It will be seen that the device is extremely convenient because it may be readily attached to any form of barrow or small carriage of the same general character and because it may be used not only for distributing powdered fertilizer but is adaptable for use in a number of other circumstances where it is desired to shake powdered material onto the ground. Thus it may be used in icy weather for distributing saw-dust, sand, or ashes on icy sidewalks. It may be used for distributing grass seed over lawns, and it is obvious that it may be used with any form of fertilizer, and inasmuch as the discharge openings may be readily controlled as to size, the sowing of fertilizer may be readily regulated. It is particularly adapted to sowing bone meal, wood ashes, lime, pulverized manure, etc. The cylinder and allied parts are preferably made of galvanized iron. By removing the caps at the ends of the cylinder the shaft and mixer may be readily removed permitting the interior of the cylinder to be thoroughly cleaned in case of necessity.

Having thus described my invention, what I claim is:

1. A fertilizer distributer comprising a cylinder having oppositely disposed removable caps, the bottom of the cylinder being provided with discharge openings, and the top of the cylinder with a filling opening, a shaft passing longitudinally through the cylinder and carrying mixers thereon and rotatable therewith, the ends of the shaft being supported in said caps, a hanger supporting the middle of the shaft, a sprocket wheel mounted upon the shaft, the cylinder being formed with openings for the passage of a sprocket chain, and a feed regulating slide mounted upon the bottom of the cylinder and having openings adapted to more or less register with the openings in the bottom of the cylinder.

2. A fertilizer distributer comprising a cylinder open at its ends and formed with a filling opening and with a plurality of discharge openings in its bottom, caps having screw threaded engagement with the ends of the cylinder and having shaft bearings, a longitudinally extending shaft supported in said bearings and prevented from longitudinal movement by said bearings, mixers carried upon said shaft, a sprocket wheel mounted upon the shaft, a hanger adjacent the sprocket wheel engaging an intermediate portion of the shaft, a sprocket chain passing over the sprocket wheel, the cylinder being formed with openings for the passage of the sprocket chain, hangers embracing the cylinder adjacent its opposite ends and adapted to be connected to the frame of a carriage, said hangers at the bottom of the cylinder being formed each with arcuate portions offset from the cylinder, and a feed regulating slide mounted in said arcuate offset portions for longitudinal movement, said slide being provided with distributing openings adapted to register with the openings in the bottom of the cylinder.

3. The combination with a wheel-barrow including side bars and a wheel having a hub, of a sprocket wheel mounted upon the hub, a cylinder supported upon the under side of the frame bars, the bottom of the cylinder being formed with perforations, the top of the cylinder having a filling opening, caps closing the end of the cylinder, a shaft rotatably mounted on said caps and extending through the cylinder, mixers mounted upon the shaft, a sprocket wheel mounted upon the shaft, a sprocket chain passing over the wheel and passing out through the openings in the cylinder and engaging the sprocket wheel on the hub, hangers embracing the cylinder near its opposite ends extending upward and attached to the side bars of the barrow frame, the lower portion of said hangers being outwardly offset, and a slide disposed in said offset portion and having perforations adapted to register with the discharge openings in the cylinder.

4. A distributer of the character described comprising a cylinder having caps closing its ends and formed with a filling opening in its top and discharge openings in its bottom, means disposed within the cylinder for agitating the contents thereof, means for regulating the discharge of material from the openings in the bottom of the cylinder, one end of the cylinder being provided with a refuse discharge opening, and a closure movable from said opening or into a closed position.

5. The combination with a wheelbarrow, of a distributing cylinder supported below the wheelbarrow and having distributing openings in its bottom and provided with a filling opening, a stop, of a longitudinally movable bottom board forming a part of the bottom of the wheelbarrow and longitudinally movable to open or close the inlet opening of the cylinder.

6. The combination with a wheelbarrow, of a distributing receptacle operatively supported from and depending below the bottom of the wheelbarrow and having discharge openings in its bottom and a filling opening in its top and formed with an upwardly extending neck defining said filling opening, of a bottom board forming a part of the bottom of the wheelbarrow and longitudinally movable, said bottom board normally closing the filling neck, and means for limiting the sliding movement of the bottom board.

In testimony whereof I hereunto affix my signature in the presence of two witnesses.

THOMAS TURNER.

Witnesses:
  STEPHEN T. BELL,
  ARTHUR C. CLAPP.

Copies of this patent may be obtained for five cents each, by addressing the "Commissioner of Patents, Washington, D. C."